United States Patent

[11] 3,599,785

| [72] | Inventors | Jack S. Stuart<br>Rt. 3, Nashville, Ark. 71852;<br>Jerry D. Pennington, Rt. 2, Murfeesboro, Ark. 71958 |
|---|---|---|
| [21] | Appl. No. | 842,643 |
| [22] | Filed | July 17, 1969 |
| [45] | Patented | Aug. 17, 1971 |

[54] MACHINE FOR REMOVING LITTER FROM POULTRY HOUSES
1 Claim, 6 Drawing Figs.

[52] U.S. Cl. ..................................................... 198/233, 198/126
[51] Int. Cl. ....................................................... B65g 41/00
[50] Field of Search ........................................... 198/233, 126, 2

[56] References Cited
UNITED STATES PATENTS

| 1,766,293 | 6/1930 | Grimes | 198/233 |
| 2,568,865 | 9/1951 | Neighbour et al. | 198/233 |
| 2,577,926 | 12/1951 | Stiles | 198/126 X |
| 2,712,869 | 7/1955 | Belt | 198/233 X |
| 3,184,045 | 5/1965 | Fry | 198/233 |

FOREIGN PATENTS

| 1,091,488 | 10/1960 | Germany | 198/233 |

*Primary Examiner*—Richard E. Aegerter
*Assistant Examiner*—Douglas D. Watts
*Attorney*—Charles E. Lightfoot ABSTRACT: A machine for removing litter from poultry houses of the type having mesh floors elevated above the ground level and from similar locations. The machine includes a wheeled vehicle which carries an elongated conveyor or chute or duct which may be extended beneath the elevated floor of the poultry house by maneuvering of the vehicle and operated to collect the litter from the ground there beneath and convey the same to a location rearwardly of the vehicle for disposal. The vehicle has front and rear wheels mounted for vertical adjustment by pressure fluid mechanism to elevate and lower the conveyor chute and which may also be adjusted to regulate the angular position of the chute relative to the horizontal independently of the elevation of the chute to enable the machine to be used on sloping ground while maintaining the chute with its forward end positioned to be extended into the poultry house at a location to collect litter therefrom.

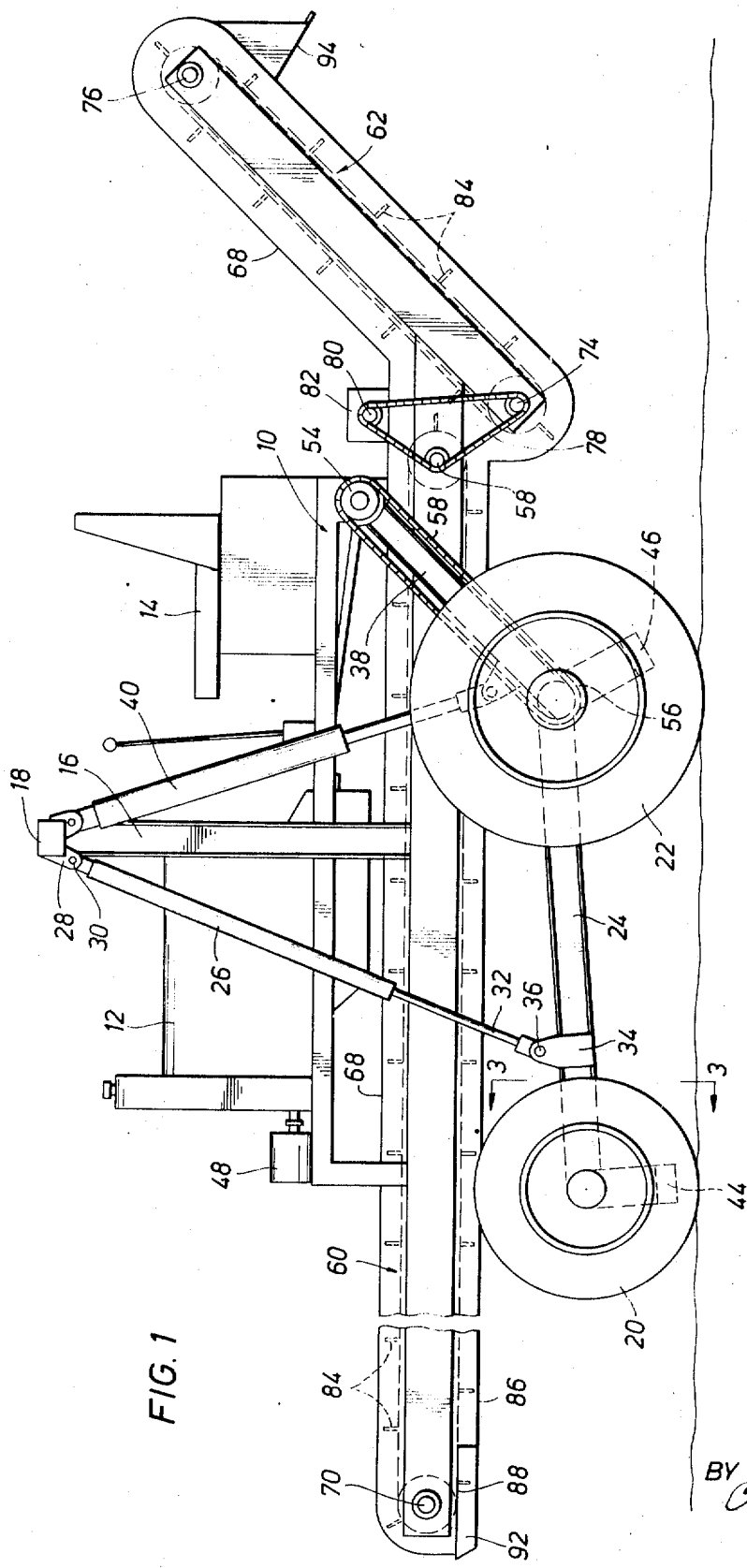
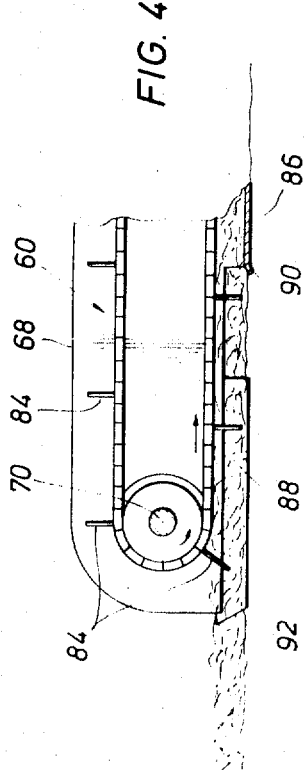
FIG. 1
FIG. 4
Jack S. Stuart
Jerry D. Pennington
INVENTORS
BY Charles E. Lightfoot
ATTORNEYS

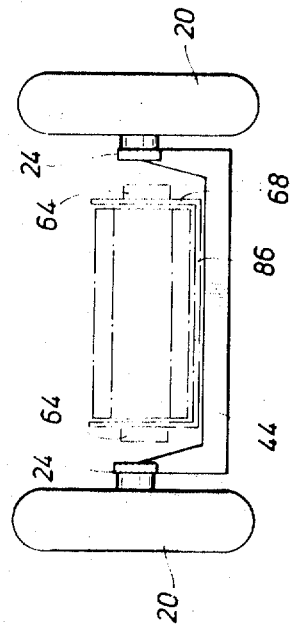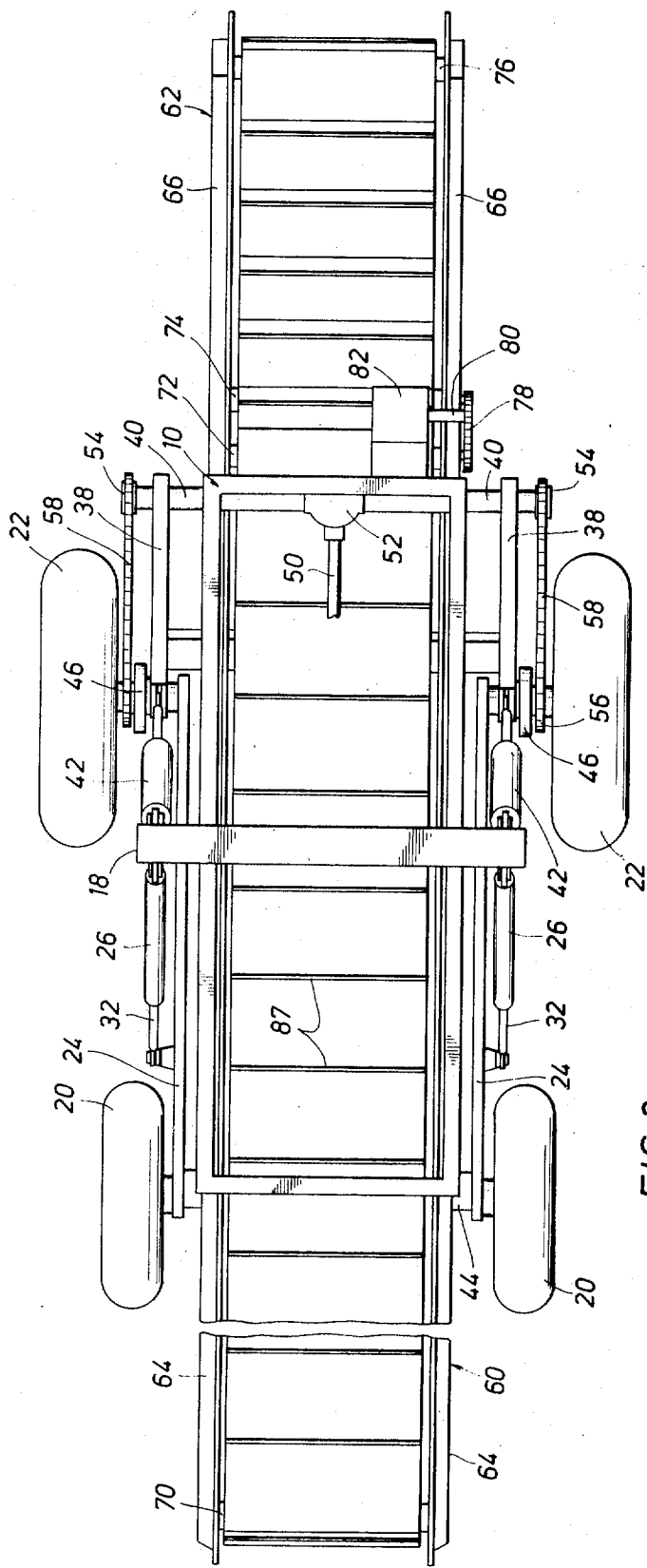

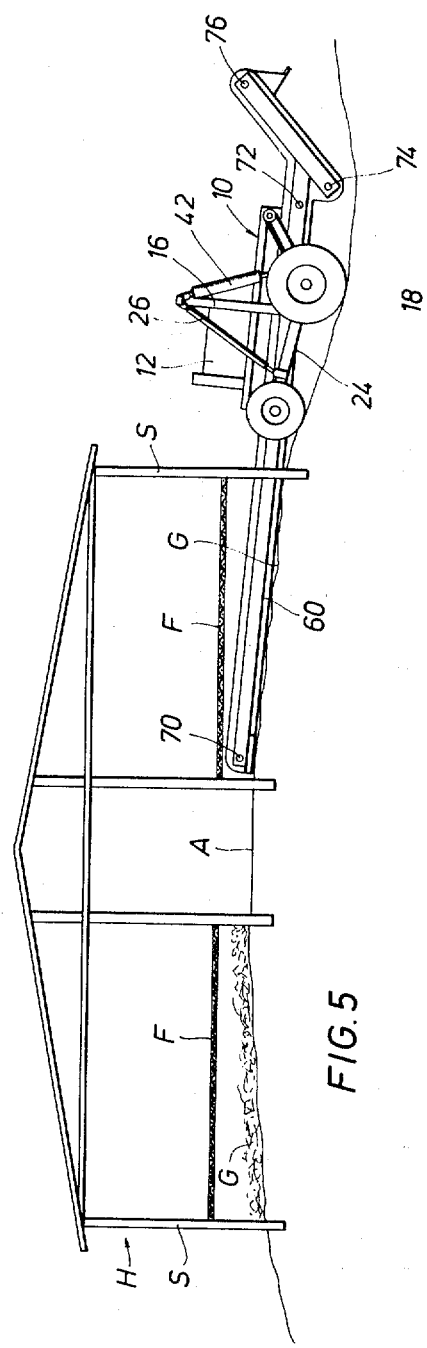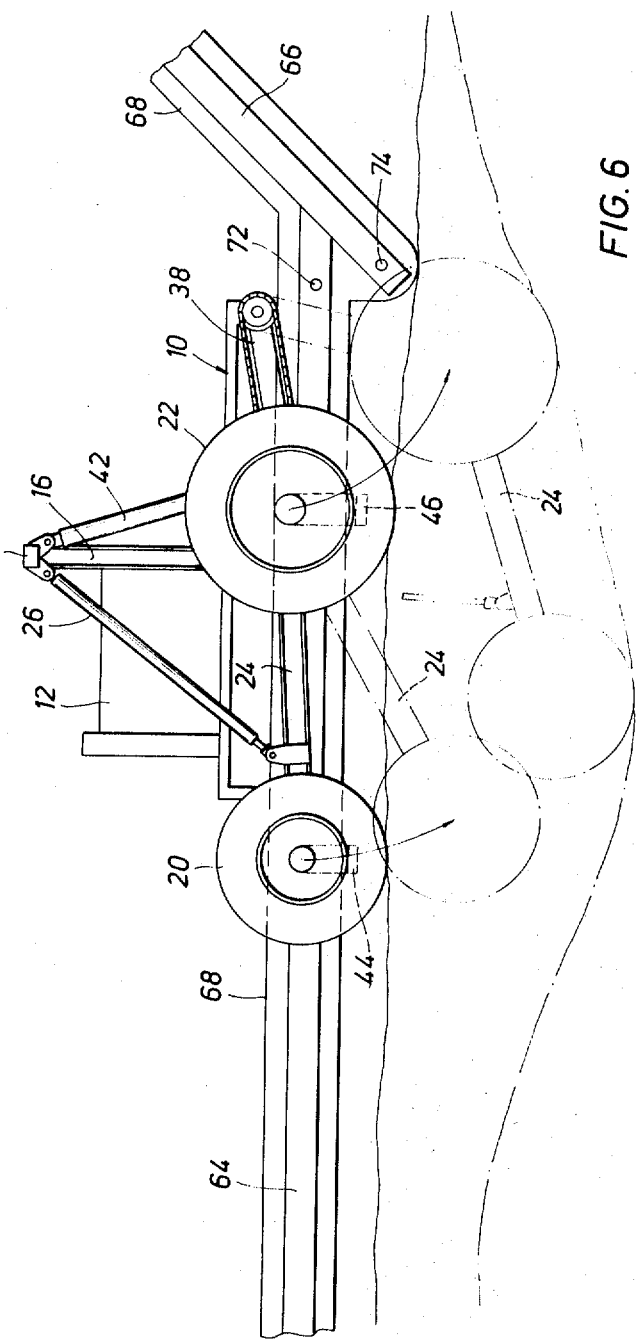
Jack S. Stuart
Jerry D. Pennington
INVENTORS
BY Charles E. Lightfoot
ATTORNEY

MACHINE FOR REMOVING LITTER FROM POULTRY HOUSES

BACKGROUND OF THE INVENTION

In the raising of poultry on an extensive scale, it is customary to keep great numbers of birds in poultry houses of large size, the floors of such houses being often covered with litter, such as straw, sawdust, or the like, in which the bird are allowed to scratch. After a period of time, it becomes necessary to remove the litter and replace it with fresh material.

To avoid the labor and expense of removal and replacement of litter in this manner, poultry houses are frequently provided with elevated meshlike floors, formed of wire, such as the woven wire mesh commonly known as "chicken wire," upon which the birds are confined, so that their droppings will be accumulated on the ground beneath to facilitate removal. The floor or ground beneath such elevated floors is usually constructed to slope downwardly from a central line extending longitudinally of the building toward the sides thereof, and the sidewalls of the building are cut away or provided with removable portions or doors below the elevated floors, so that the litter may be conveniently removed along each side of the building by raking or scraping the litter down the sloping floor.

The removal of litter from poultry houses constructed in this manner is usually accomplished manually, and no convenient machine is known by which the removal operation could be readily carried out mechanically.

At times large poultry houses are constructed at locations where the contour of the land is irregular, the ground being levelled over an area upon which the house is built, while sloping away upwardly or downwardly therefrom so that it becomes impossible to maintain a machine or vehicle in a level condition adjacent a side of the building to permit its convenient use in carrying out litter removal operations of this kind.

SUMMARY OF THE INVENTION

Briefly described, the machine of the invention comprises a wheeled vehicle having a frame to which an elongated conveyor chute or duct is attached, within which a collecting conveyor and a discharging conveyor are enclosed and arranged for simultaneous operation to collect litter from the ground forwardly of the machine and discharge the same rearwardly thereof. The vehicle has front and rear pairs of wheels which are mounted for vertical swinging movement and which are operated by hydraulic cylinders to adjust the wheels vertically to regulate the height at which the conveyor chute is supported and the angular position of the chute relative to the horizontal whereby the chute may be positioned at a desired elevation and angle to allow the chute to be extended into a poultry house or other location to collect litter from the ground level therein. The wheels are adjustable to allow the machine to be operated on sloping ground while maintaining the chute in a position to collect litter from the ground level in the poultry house by maneuvering the machine forwardly and backwardly. One pair of the wheels of the vehicle is connected to the frame of the vehicle by swing arms to allow vertical swinging movement thereof, and the other pair of wheels is connected to said one pair by swing arms which are separately operated to swing said other pair vertically relative to the vehicle frame and to said one pair, whereby elevation and angular positioning of the conveyor duct may be quickly and accurately accomplished and controlled while firmly supporting the same at the desired location. Chain drive or other similar mechanism is provided for driving the one pair of wheels to allow the same to be adjusted vertically while being rotated to propel the vehicle.

BRIEF DESCRIPTION OF THE VIEWS OF THE DRAWINGS

FIG. 1 is a side elevational view of a preferred embodiment of the invention;

FIG. 2 is a top plan view of the invention as illustrated in FIG. 1;

FIG. 3 is a cross-sectional view, taken along the line 3—3 of FIG. 1, looking in the direction indicated by the arrows;

FIG. 4 is a fragmentary longitudinal, central, cross-sectional view, on a somewhat enlarged scale, showing the front end of the litter-gathering mechanism and illustrating the manner in which same operates;

FIG. 5 is a side elevational view on a somewhat reduced scale, showing the machine in use and illustrating its manner of operation in connection with a poultry house; and, FIG. 6 is a fragmentary side elevational view of the machine of the invention, showing the manner in which the same is operated under different conditions of ground contour or elevation.

DETAILED DESCRIPTION OF A PARTICULAR EMBODIMENT OF THE INVENTION

The litter-removing machine of the present invention is illustrated herein in connection with a poultry house, such as that generally designated H in FIG. 5, of a type having elevated mesh or screenlike floors F, beneath which the ground or floor G slopes downwardly from a central longitudinal location or aisle A toward the sidewalls S of the building. In a poultry house of this type, the poultry are confined on the elevated floors and the sidewalls S of the building are cut away or provided with removable portions or doors below the elevated floors F to allow the removal of the accumulated litter by scraping or raking the same down along the sloping floor areas G.

The litter-removing machine comprises a vehicular frame, generally designated 10, which may be of rectangular shape and upon which a suitable source of power, such as the internal combustion engine 12, of a usual type, is mounted. A seat 14, of usual construction, is provided on the frame for the use of the operator.

The frame is provided with a pair of uprights, such as that shown at 16, located centrally of each side of the frame, which are connected at their upper ends by a crossbar 18.

The frame is supported on front and rear pairs of wheels 20 and 22, respectively, mounted on side frame members 24, each of which is linkingly connected to the crossbar 18 by a pressure cylinder 26. Each of the pressure cylinders 26 is pivotally connected at one end to the crossbar 18, as by means of a perforated lug 28 on the crossbar, to which the cylinder is connected by a pivot pin 30, and the connecting rod 32 of each cylinder is similarly pivotally connected to one of the side frame members 24, as by means of a perforated lug 34, as best seen in FIG. 1, to which the rod is connected by a pivot pin 36.

The side frame structure upon which the wheels 20 and 22 are mounted also includes side frame members 38, one for each of the members 24, pivotally connected at their forward ends to the wheels 22, and at their rear ends to the frame 10 above on the shaft 40, as best shown in FIGURE to allow the wheels 22 to swing vertically. The members 38 are linkingly connected to the crossbar 18 by pressure cylinders 42 in a similar manner to the connection of the members 24 to the crossbar by the cylinders 26.

The front wheels 20 are carried at the ends of a front axle 44 of the drop-center type and the rear wheels 22 are similarly carried on a rear axle 46 also of the drop-center type.

It will be apparent that by the above construction, the front and rear wheels may be readily adjusted vertically to move the frame 10 to any desired elevation within the range of such adjustment and to tilt the frame at any desired angle to the horizontal within such range.

Suitable means, such as a hydraulic pump 48 mounted on the frame 10, is provided for operation by the engine 12 for supplying hydraulic fluid under pressure to the cylinders 26 and 40, under the control of a suitable valve and piping system of any convenient type, not shown, whereby the pressure cylinders may be actuated to adjust the elevation and tilt of the frame 10 as desired.

The engine 12 has the usual drive shaft 50, suitably connected through a different drive 52 to the rear axles or shafts 40, each of which carries a sprocket 54 which is drivingly connected to a sprocket 56 on each of the rear wheels 22, by a drive chain 58, whereby the vehicle may be propelled in a well-known manner.

The machine of the invention includes litter collecting and conveying mechanism comprising endless conveyors, generally designated 60 and 62, of which the conveyor 60 serves for the collecting or gathering of the litter, while the conveyor 62 performs the function of elevating the litter and depositing it in a suitable receptacle. The conveyors are supported on an elongated, framelike structure having spaced parallel side members 64 and 66, and the conveyors are enclosed in a conveyor chute or duct structure 68, which may conveniently be formed of sheet metal or the like, and rectangular in cross section.

The conveyors may be of the endless belt or chain type, suitably mounted on rotatable shafts, such as those shown at 70, 72, 74 and 76, carried on the side members 64 in the usual manner. The shafts 72 and 74 are arranged to be driven by a chain 78 which is operated by a shaft 80 of suitable gear mechanism generally designated 82 which is connected in a usual manner to be operated by the engine 12 through the intermediation of mechanism of a usual type, not shown, arranged to be controlled by the operator of the machine and by which conveyors may be operated independently of the movements of the vehicle.

The conveyors 60 and 62 are of a type having laterally extending, longitudinally spaced blades or fins 84, and the bottom wall 86 of the enclosure or duct 68 is cut away at the front end of the same, as shown at 88 in FIG. 4, to allow the blades 84 to move along the ground in position to scrape litter into the front end of the duct upon operation of the conveyors.

The end portion of the bottom wall 86 adjacent the cut away portion 88 may be turned downwardly somewhat to form a lip 90, best seen in FIG. 4, over which the litter is guided into the duct.

The sidewalls of the duct are provided at its forward end with downwardly extending plates, such as that shown at 92 in FIG. 4, whose lower edges are positioned for engagement with the ground to hold the blades 84 at a slight elevation above the ground to prevent the blades from digging into the ground during the collecting operation of the machine.

The rear end of the duct 68 may be provided with a downwardly extending hood 94 by which the litter being discharged from the machine is directed downwardly.

In the operation of the machine, constructed as described above, the machine is maneuvered into a position to extend the forward end portion of the duct 68 into the poultry house beneath the elevated floors F, as shown in FIG. 5, with the lower edges of the guide plates 92 engaging the ground, and the conveyors are then operated to scrape litter from the ground into the front end of the duct, from whence it is passed by the conveyors through the duct and discharged from the rear end of the duct into any desired container for disposal.

In moving the duct into proper position to collect the litter, the pressure cylinders 40 may be actuated to adjust the elevation of the frame 10 by swinging the wheels 22 vertically on the members 38, and the angular position of the duct relative to the horizontal may be suitably adjusted by actuation of the cylinders 26, to position the duct for movement along the ground to effectively collect the litter thereon. By moving the vehicle forwardly or backwardly with the guide plates 92 in sliding engagement with the ground, the litter may be effectively removed from beneath the entire area of the elevated floors.

As illustrated in FIGS. 5 and 6, in the event that the ground adjacent the sides of the poultry house slopes away upwardly or downwardly, the cylinders 26 and 40 may be readily actuated to adjust the wheels 20 and 22, as seen in dashed lines in FIG. 6, to bring the duct to the proper elevation and angular position for the removal of litter from the ground beneath the elevated floors.

It will be apparent that the angle of the duct 68 relative to the horizontal may be adjusted independently of the adjustment of the height of the duct above the ground.

The invention thus provides a litter gathering and disposal machine which is capable of use for the removal of litter of various kinds, and which is easily operated on sloping or irregular ground and in locations where the vertical clearance between the ground level and an elevated floor is very limited.

Having thus clearly shown and described the invention, what we claim as new and desire to secure by Letters Patent is:

1. In a litter-collecting machine,
a frame,
front and rear pairs of wheels for the frame,
conveyor means supported on the frame and extending longitudinally between the wheels of said pairs and beyond the wheels of said front pair,
means movably connecting the frame to the wheels for vertical swinging movement to adjust the height of the frame above the ground and the angular position of the frame relative to the horizontal to position the front end of the conveyor means for engagement with the ground during longitudinal movement of the machine along the ground, said connecting means including
upright means extending upwardly from said frame, and
extensible means connected to said upright means above said fame and to said pairs of wheels in position to impart independent vertical swinging movement to each of said pairs relative to said frame.